Feb. 12, 1952     A. J. MACDONALD     2,585,394

BLAST FURNACE

Filed Feb. 2, 1949

INVENTOR.
ALEXANDER J. MACDONALD
BY

Patented Feb. 12, 1952

2,585,394

UNITED STATES PATENT OFFICE 2,585,394

BLAST FURNACE

Alexander J. Macdonald, Buffalo, N. Y., assignor to National Steel Corporation, a corporation of Delaware Application February 2, 1949, Serial No. 74,062

7 Claims. (Cl. 75—41)

The present invention relates to method of and apparatus for operating blast furnaces and is primarily concerned with tapping molten slag and molten metal through the cinder notch of a blast furnace, especially when the iron notch is closed by solidified metal so that iron can not be cast through the iron notch.

A blast furnace with the customary construction includes a vertical hollow shaft or stack extending upwardly from the hearth. Iron and cinder notches extend through the wall of the furnace. Iron ore, limestone and coke are periodically charged into the top of the furnace, and a hot air blast is blown into the furnace through tuyères spaced apart about the hearth at the bottom of the furnace. The blast burns the coke to smelt the charge descending downwardly countercurrently to the ascending gaseous products of combustion. The smelting of the charge produces molten iron which collects at the bottom of the hearth in a pool and produces molten slag which collects in a layer on the pool of molten iron. In normal operation, iron is periodically cast or tapped through the iron notch, and between casts slag is periodically flushed out of the furnace through the cinder notch. At times, and for various reasons, it is desirable to close down the furnace completely for a few days or weeks. To close the furnace down, it is banked, and this is done by draining the furnace as dry as possible of all iron and slag, shutting off the blast and removing the tuyères. The openings, including the cinder notch, are bricked up tight and the furnace allowed to remain inactive.

When bringing in a banked furnace—that is, bringing the furnace back to normal operation—the bottom is cold, and the molten iron dripping down into the hearth solidifies and closes the iron notch so that it is impossible to cast iron through the iron notch. The cinder notch is closer to the tuyères, and, consequently, closer to the hottest zone of the furnace. As it is imperative that iron and slag be withdrawn from the furnace at frequent, relatively short intervals to protect the furnace, slag and iron are tapped through the cinder notch. This is done by piercing a hole through the brickwork in the cinder notch to permit tapping of the molten slag and iron. The brickwork is rapidly eroded by the slag and metal and the passage soon becomes so large it is difficult, if not impossible, to maintain a good seal against the pressure in the furnace or properly control the flow of slag and iron from the furnace.

Accordingly, it is an object of the present invention to provide a method of and apparatus for operating a blast furnace that will enable both molten slag and iron to be tapped from the furnace through the cinder notch when the iron notch is closed so that the iron can not be cast through the iron notch.

Another object of the present invention is to provide a method of and apparatus for operating a blast furnace that will enable both slag and iron to be tapped from the furnace through the cinder notch without damage to the cinder notch or cinder notch cooler and that will eliminate the troubles caused by the eroding brickwork.

In accordance with the present invention and when bringing in a banked blast furnace, the refractory brickwork is removed from the cinder notch cooler which was left in place when the furnace was banked. The cinder notch is closed in a novel manner by means of a carbon plug having a relatively small passage extending through the plug and filled with clay or other refractory material. The tuyères are placed in position, and the blast is turned on to put the furnace back into operation. When sufficient molten slag and metal have been produced in the furnace so that it is necessary to tap the furnace, the clay is removed from the carbon plug passage and the molten slag and iron allowed to flow out through the cleared passage. The passage is sufficiently small to maintain a good seal against the pressure in the furnace when filled and sufficiently small to control the flow of molten slag and metal when open. After the furnace has been flushed out, the plug passage is again closed with refractory material. These steps are repeated until the furnace is back to normal operation, at which time slag is flushed out of the cinder notch and molten iron is tapped through the iron notch. The carbon plug resists erosion, and the passage through the plug remains substantially constant in size so as to maintain a good seal against the pressure in the furnace when filled and to maintain control of the flow of molten slag and iron when open. In addition, the carbon plug protects the cinder notch cooler so that the cinder notch cooler may be left in place when the furnace is banked. This reduces the amount of work required to bank the furnace and materially reduces the work required to bring in the banked furnace. After the furnace has been brought in and is back on normal operation, the plug may be removed and later reused for bringing in another banked blast furnace.

These and other advantages and objects of the present invention will become more readily apparent from the following description, taken in connection with the accompanying drawing, in which.

Figures 1, 2, 3:
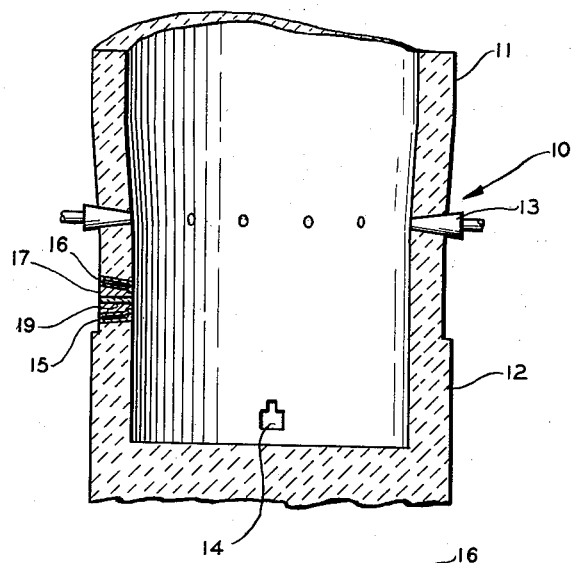
Figure 1 is a fragmentary sectional view of the lower portion of a blast furnace illustrating the present invention.
Figure 2 is an enlarged, fragmentary sectional view of the cinder notch shown on a smaller scale in Figure 1; and, Figure 3 is an enlarged view of the carbon plug shown in Figure 1.

Referring to the drawing, the blast furnace includes an upper, substantially cylindrical portion or shaft 11 and a lower hearth 12 at the bottom of the furnace. A plurality of tuyères 13 are arranged around the periphery of the hearth 12 and are connected to a suitable source of blast air, not shown, for discharging a blast of air into the furnace to burn the coke and smelt the charge. The charge of iron ore, coke and limestone are charged into the top of the stack 11 in the usual manner and the charge moves downwardly through the stack to the combustion zone adjacent tuyères 13 countercurrently to the upwardly flowing gases. The molten iron collects in the bottom of the hearth 12 in a pool, and the molten slag collects in a layer on the top of the pool of molten iron. An iron notch 14 is provided in the hearth 12 for the periodic tapping of the molten iron. Above the iron notch 14 in the hearth 12 there is a cinder notch 15, and the slag is periodically flushed out through this notch. The cinder notch 15 contains an annular, hollow water-cooled cinder notch cooler 16 having a substantially frusto-conical internal surface. The cinder notch cooler or outer cooler 16 is closed by means of a carbon plug 17 having a substantially frusto-conical outer surface 18 fitting against the internal surface of the cinder notch cooler. The carbon plug 17 contains a relatively small passage 19 extending therethrough and filled with fire clay or other suitable refractory material 20. The passage 19 is about 4 inches in diameter.

When being operated under normal conditions, the blast furnace will have in the cinder notch 15 an intermediate cooler and a monkey closed by means of a water-cooled bot, all located within the cinder notch cooler 16. Such an arrangement is shown in each of Patents Nos. 2,294,162 and 1,154,281.

When it is desirable to close down and bank the blast furnace, the iron notch 14 is closed and the tuyères 13 are removed and their openings filled with refractory material. In addition, the apparatus in the cinder notch, including the monkey and intermediate cooler, and usually the outer or cinder notch cooler 16, are all removed from the cinder notch 15, and the opening is filled with refractory brick.

When the blast furnace which has been banked in the customary manner is to be blown in, the tuyères are placed in position and connected to the source of blast air. Coke is charged into the furnace, and molten slag and iron are produced in the furnace. The hearth, and particularly the bottom of the hearth, is relatively cold and iron dripping down toward the bottom of the hearth solidifies and closes the iron notch so that it is impossible to cast the furnace through the iron notch 14 in the customary manner. The cinder notch 15 is above the iron notch and is much closer to the tuyères 13 than the iron notch 14, and consequently is closer to the hottest zone of the furnace so that iron and slag can be withdrawn from the furnace through the cinder notch until the hearth of the furnace becomes hot enough to resume normal operations. The molten iron and slag must be withdrawn from the furnace at short intervals during the blowing-in period to protect the other parts of the furnace and to prevent breakout at the tuyère level. Prior to the use of the carbon plug 17, the slag and molten iron were flushed out of the furnace during the blowing-in period through a passage in the brickwork in the cinder notch. When the iron and slag stopped running, the hole was plugged.

Flushing slag and metal out through the cinder notch partially filled with refractory brick causes a number of problems. The slag and molten metal quickly erode the brickwork and enlarge the hole or passage through the brickwork so that control of the flow of molten metal and slag is lost. When it is necessary to plug this enlarged hole with clay, it is very difficult, and at times impossible, to maintain a good seal against the pressure in the furnace. The brickwork erodes so much that it is the normal practice to remove the cinder notch cooler 16 from the cinder notch to prevent molten metal from attacking the cooler. If molten metal came in contact with the cooler 16, it would pierce the wall of the cooler and permit the escape of water which would cause a disastrous explosion. For this reason, the cinder notch cooler 16 is removed as a safety measure. This increases the work required to bank the furnace and greatly increases the work required in replacing the cinder notch cooler when the furnace is returned to normal operation.

The present invention provides a novel method of and apparatus for blowing-in a furnace having a chilled hearth and an iron notch closed by frozen iron caused by banking the furnace, or caused by leaks in the water-cooled furnace members that may drown out the furnace, or caused by improper charging of the furnace, or resulting when blowing-in a new furnace. In accordance with the present invention, when blowing-in such a furnace, the cinder notch cooler 16 which has been left in place is closed by means of the carbon plug 17 having its passage 19 filled with refractory material 20. The plug 17 is fastened in place in any suitable manner. After the blast has been turned on through tuyères 13, and when sufficient molten slag and iron have accumulated so that it is necessary to flush out the furnace, the refractory material 20 is drilled out and the molten slag and metal flow out through passage 19. When the molten material stops running, the passage 20 is replugged with refractory material until the next flushing period. These steps of alternately opening and plugging passage 20 are repeated until the furnace is back to normal operation at which time the hearth is sufficiently hot so that the molten iron collects in the bottom of the hearth in a pool and the molten slag collects in a layer on top of the pool of molten iron. When the chilled hearth is back to normal temperature, iron can be tapped through the iron notch 14 and the slag can be flushed out through the cinder notch 15 in the usual manner. When the furnace is put back into normal operation, the carbon plug 17 is removed and the cinder notch cooler 16 is closed in the usual manner by means of an intermediate or monkey cooler, a monkey and a bot such as is shown in the previously referred to patents. The removed carbon plug 17 may be re-used the next time it is necessary to blow-in this or another furnace having a chilled hearth.

The present method of blowing-in a furnace by means of a carbon plug in a cinder notch cooler has numerous advantages over the use of brickwork as has been customary prior to the present invention. The carbon plug is highly resistant to erosion and fully protects the cinder notch cooler 16 so that it may be left in place which greatly decreases the work involved, particularly when blowing-in the furnace. In addition, the passage 19 through the plug remains substantially constant in size (4 inches in diameter) so that the flow of molten material from the furnace can be controlled and so that the passage may be readily plugged with clay or other refractory material to tightly seal the opening against the pressure maintained in the furnace. The carbon plug has such a high degree of resistance to erosion that it may be reused a number of times.

The carbon plug 17 may be formed of any suitable carbon material but is preferably formed of carbon molded under heat and pressure with a binder and may be of substantially the same material as has been used heretofore to cover the bottom of the hearth.

While the present invention has been described more particularly in connection with blowing-in a banked furnace, it is to be understood that the present invention is applicable for blowing-in a furnace having a chilled hearth resulting from other causes. A hearth of a blast furnace may be chilled to such a low temperature that the iron solidifies and can not be cased through the iron notch 14 from a number of causes.

At times, the water-cooled members of a furnace may be broken so that the water drowns out the furnace and chills the hearth. In addition, improper charging of the furnace may cause a chilled hearth, and when a new furnace is blown-in there may be a period when the hearth is chilled so that iron can not be tapped through the iron notch.

I claim:

1. In the method of bringing in a banked blast furnace having a relatively lower, closed iron notch and a relatively higher cinder notch containing an annular, water-cooled, outer cinder notch cooler as the only water-cooled element in the cinder notch, the steps comprising closing the cinder notch cooler with a carbon plug having a passage therethrough filled with refractory material, the carbon plug extending at least the full length of the cinder notch cooler, operating the furnace to produce molten slag and metal, removing the refractory material from the carbon plug passage and tapping both molten slag and molten metal through the plug passage while the iron notch is maintained closed, said plug protecting the cinder notch cooler against attack by the molten slag and iron.

2. The method of bringing in a banked blast furnace as claimed in claim 1, which includes the step of closing the plug passage with refractory material after molten slag and metal have been tapped.

3. The method of blowing-in a blast furnace having a chilled hearth including a relatively lower, closed iron notch and a relatively higher cinder notch containing an annular cinder notch cooler filled with refractory brickwork, the combination of steps comprising, removing the brickwork from the cinder notch cooler, closing the cinder notch cooler with a carbon plug having a passage therethrough filled with refractory material, operating the furnace to produce molten slag and metal, and removing the refractory material from the carbon plug passage and tapping molten slag and metal through the plug passage while the iron notch is maintained closed, said plug protecting the cinder notch cooler against attack by the molten slag and iron.

4. The method of blowing-in a blast furnace having a chilled hearth including a relatively lower, closed iron notch and a relatively higher cinder notch containing an annular cinder notch cooler filled with refractory brickwork, the combination of steps comprising, removing the brickwork from the cinder notch cooler, closing the cinder notch cooler with a carbon plug having a passage therethrough filled with refractory material, operating the furnace to produce molten slag and metal through the plug passage while from the carbon plug passage and tapping molten slag and metal through the plug passage while the iron notch is maintained closed, said plug protecting the cinder notch cooler against attack by the molten slag and iron, and again closing the plug passage with refractory material.

5. In a blast furnace having a chilled hearth containing a relatively higher cinder notch and a relatively lower, closed iron notch, the combination comprising, an annular, water-cooled cinder notch cooler in the cinder notch, a carbon plug in the cinder notch cooler extending the length of the cinder notch cooler having a passage for casting slag and iron from the furnace, and refractory material filling the carbon plug passage to prevent the flow of slag and iron from the furnace.

6. In a blast furnace having a chilled hearth containing a relatively higher cinder notch and a relatively lower, closed iron notch, the combination comprising, an annular, water-cooled cinder notch cooler in the cinder notch, a carbon plug extending the length of the cinder notch cooler having a passage for casting slag and iron from the furnace, said passage being approximately four inches in diameter, and refractory material filling the carbon plug passage to prevent the flow of slag and iron from the furnace.

7. In a blast furnace having a chilled hearth containing a relatively higher cinder notch and a relatively lower, closed iron notch, the combination comprising, an annular, water-cooled cinder notch cooler in the cinder notch, said cooler having an internal, substantially frusto-conical surface, a carbon plug in the cinder notch cooler having a passage for casting slag and iron from the furnace and having an external surface fitting the entire internal surface, and refractory material filling the carbon plug passage to prevent the flow of slag and iron from the furnace.

ALEXANDER J. MACDONALD.

REFERENCES CITED

The following references are of record in the file of this patent:

UNITED STATES PATENTS

| Number | Name | Date |
|---|---|---|
| 689,585 | Hartman | Dec. 24, 1901 |
| 1,154,281 | Bates | Sept. 21, 1915 |
| 1,514,849 | Gerwig | Nov. 11, 1924 |
| 1,565,084 | Frerichs | Dec. 8, 1925 |
| 1,780,485 | Hopkins | Nov. 4, 1930 |
| 2,023,025 | McKee | Dec. 3, 1935 |
| 2,082,280 | Fox | June 1, 1937 |
| 2,409,337 | Yuhas | Oct. 15, 1946 |
| 2,468,738 | Durfee et al. | May 3, 1949 |

OTHER REFERENCES

Blast Furnace and Steel Plant, April 1947, page 460.

Blast Furnace and Steel Plant, November 1947, page 1359. Published by Steel Publications, Inc., Pittsburgh, Pa.

Blast Furnace Practice, vol. III, pages 74 to 77. Edited by Clements. Published in 1929 by Ernest Benn Ltd., London, England.